March 19, 1963  D. H. LANE ET AL  3,082,277
THERMOELECTRIC ELEMENTS
Filed April 19, 1960
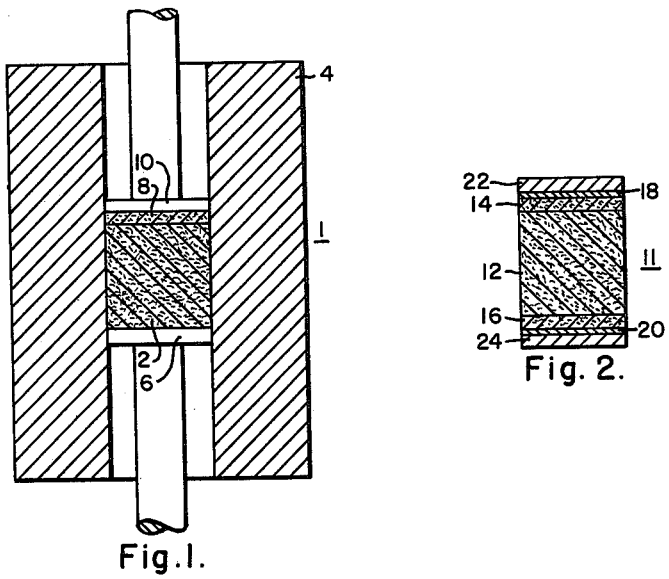
Fig.1.
Fig. 2.
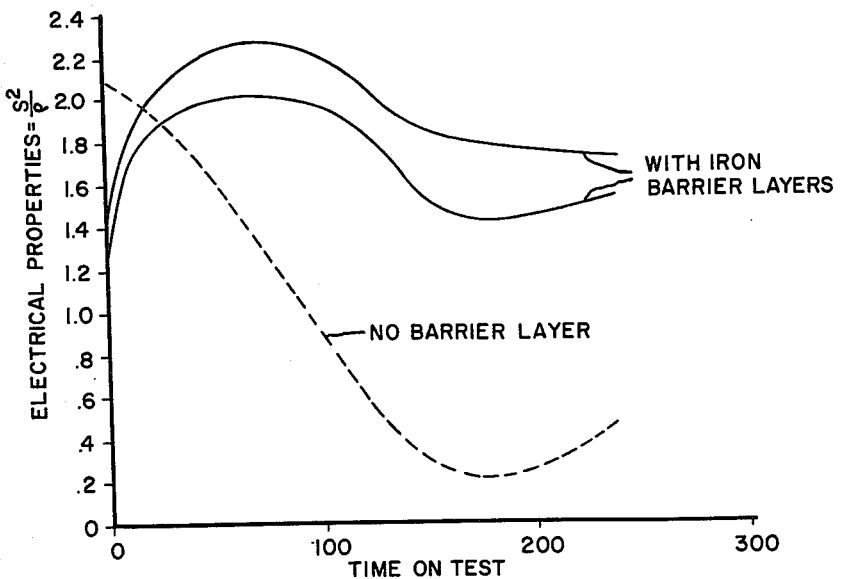
Fig. 3.
WITNESSES:
INVENTORS
Donald H. Lane and
William Feduska.
BY
ATTORNEY United States Patent Office 3,082,277
Patented Mar. 19, 1963

3,082,277
THERMOELECTRIC ELEMENTS
Donald H. Lane, Washington Township, Westmoreland County, and William Feduska, Emsworth, Pa., assignors to Westinghouse Electric Corporation, East Pittsburgh, Pa., a corporation of Pennsylvania
Filed Apr. 19, 1960, Ser. No. 23,210
15 Claims. (Cl. 136—5)

The present invention relates to a thermoelectric body with a low electrical resistance diffusion barrier layer bonded to at least one end thereof and a process for preparing the same.

In the joining of thermoelectric materials, either to each other or to electrical conductors, it is desirable that the joint therebetween have relatively low electrical resistance and that the resistance remain low during operation in the temperature range for which the joint was designed. To have initial low resistance, the joint should be free from cracks or porosity, and the composition of the joining alloy should be such as to avoid formation of high electrical resistance compounds at the joint in the brazing operation. To maintain low electrical resistance, the joint interface must be structurally stable, which implies that interdiffusion reactions between elements of the brazing alloy or contact metals and the thermoelectric material must be prevented or minimized. The problems become more acute as the service temperature of the joint goes up.

Joints made by direct reaction of the brazing alloy elements with the elements of the thermoelectric material are inherently unstable at elevated temperatures. Since the joints are usually made in a relatively short time at the brazing temperature, the resultant phases which are produced by the brazing reaction are not necessarily those formed under equilibrium conditions. Upon holding such joints for prolonged times at operating temperature, further interdiffusion reactions can occur and new phases, approaching equilibrium, may form in the joint region both in the thermoelectric material and in the brazing alloy. These prolonged interdiffusion reactions between the brazing alloy and the thermoelectric elements, tending to form new, or stable phases, may continually change the electrical resistance of the joint. If the resultant interface phases increase the joint resistance, the efficiency of the thermoelectric device embodying said thermoelectric element will be reduced. Also, some or all of the resultant products which form at the joint after a long time at temperature may comprise very low melting eutectics or peritectics or may be phases which are lacking in oxidation resistance. Obviously a eutectic which melts below the operating temperature of the thermoelectric device will cause mechanical failure to occur. Joint oxidation during service can cause complete failure of the thermoelectric device.

It has been discovered that by bonding a protective diffusion barrier layer to the surface of a thermoelectric pellet material, the joints made by brazing electrical connector straps or differential expansion caps on the opposite side of this layer should be free from undesirable phases. Joints, in which the brazing alloy is bonded to non-reactive diffusion barrier layers, should be characterized by essentially the original structure and properties of the brazing alloy, should exhibit long time stability, and should maintain low electrical resistance properties while in service.

Therefore, it is an object of the present invention to provide a thermoelectric element suitable for use in a thermoelectric device comprising a shaped body of thermoelectric material and a relatively thin, low electrical resistance diffusion barrier layer bonded to at least one end thereof, the element being capable of operating at temperatures of up to the melting point of the thermoelectric material for prolonged periods of time without a substantial decrease in the thermoelectric efficiency of the thermoelectric device embodying said element.

Another object of the invention is to provide a thermoelectric element comprising a body of thermoelectric material comprising a solid compound of at least one element selected from the group consisting of sulfur, selenium and tellurium, reacted with at least one other element, and a relatively thin low electrical resistance diffusion barrier layer bonded to at least one end thereof, the layer composed of at least one metal selected from the group consisting of cobalt, chromium, iron, molybdenum, silicon, zirconium and titanium.

Still another object of the invention is to provide a process for forming a thermoelectric element comprising simultaneously compressing in a cylinder a quantity of a powdered thermoelectric material and a quantity of metal powder of at least one element of the group consisting of cobalt, chromium, iron, molybdenum, silicon, zirconium and titanium, the metal powder being disposed to cover the entire area on at least one end of said mass of thermoelectric material so as to function as a barrier layer, and sintering the resultant shaped body to provide a composite structure of thermoelectric material with a protective diffusion barrier layer.

Other objects of the invention will in part, be obvious and will in part, appear hereinafter.

For a better understanding of the nature and objects of the invention, reference should be had to the following detailed description and drawings in which:

FIGURE 1 is a plan view partly in cross section of one type of apparatus that may be used to carry out the process of the invention;

FIG. 2 is a cross sectional view of a thermoelectric element; and,

FIG. 3 is a graph showing in effect the comparative resistivities over a period of time of a thermoelectric material with and without a diffusion barrier layer.

In accordance with the present invention and in attainment of the foregoing objects, there is provided a thermoelectric element suitable for use in a thermoelectric device, comprising a body of thermoelectric material and a relatively thin, low electrical resistance diffusion barrier layer bonded to either one or both ends thereof. The thermoelectric material may comprise a solid compound consisting of one or more of the elements sulfur, selenium and tellurium, reacted with at least one other element, for example, the compounds lead selenium sulfide, germanium tellurium selenide, lead tellurium sulfide, and germanium sulfur selenide. Particularly suitable thermoelectric compounds are lead telluride, germanium telluride and germanium bismuth telluride. The diffusion barrier layer may comprise one of the elements cobalt, chromium, iron, molybdenum, silicon, zirconium or titanium or alloys thereof.

Referring to FIG. 1, there is shown one form of an apparatus 1 for forming a thermoelectric body with a diffusion barrier layer thereon in accordance with the invention. A thermoelectric material 2, in powdered form, is placed in a compacting cylinder 4. A compacting piston 6 is located a measured distance below the upper end of the cylinder cavity prior to placing the powder therein so that the powder may be retained in the cavity. After the die cavity is filled with the powdered thermoelectric material 2, it is leveled off so that a measured quantity is present and the piston 6 with the material 4 is then dropped slightly to a lower level. The resultant exposed cavity is then filled with a layer 8 of the metal powder and the metal powder is leveled with the top surface of the cylinder. If it is desired to provide a diffusion barrier layer on both ends of the thermoelectric body, a desired thin layer of the metal powder is placed in the cylinder cavity prior to introducing the powdered thermoelectric material 2. A compacting piston 10 is then placed in the upper end of the cavity in the cylinder and the charge 2—8 is compressed mechanically by moving the pistons toward each other under high pressure to provide a compacted composite structure. Complete bonding of the metallic barrier layer to the thermoelectric body is obtained by sintering the element 2—8 after removing it from the cylinder, for a period of time, preferably in an inert atmosphere such as argon, helium or hydrogen.

Other methods, such as electroplating, may be used to apply the metal diffusion layers to shaped bodies of thermoelectric materials which may be separately prepared, as by casting or compacting. A subsequent heat treatment may be required in some cases to cause the barrier layer to adhere to the thermoelectric body by more than a mechanical penetrating and locking mechanism.

Referring to FIG. 2 there is shown a complete thermoelectric element 11 composed of a thermoelectric body 12 with diffusion barrier layers 14 and 16 at each end thereof. Metal contacts 22 and 24, such as electrical connector straps or differential expansion caps are joined to the barrier layers 14 and 16 by means of a brazing alloy 18 and 20, respectively.

The following example is illustrative of the teachings of the invention.

In preparing lead telluride thermoelectric bodies with iron diffusion barrier layers bonded to one end thereof, eight grams of —80 mesh powder composed of lead telluride admixed with 0.07 weight percent bismuth was placed in a one-half inch diameter tool steel compacting cylinder. The apparatus was similar to the showing in FIG. 1. After the cylinder cavity was filled flush with the lead telluride powder, the bottom piston was dropped $\frac{1}{16}$ inch to lower the upper powder level. The resultant cavity was then filled with 0.3 gram of 20 micron (average diameter) carbonyl iron powder and the iron powder was leveled with the top surface of the cylinder. Then the charge was compacted at 20 tons per square inch pressure. Complete bonding of the iron to the lead telluride body was obtained by sintering the resulting compact in an enclosed boat for three hours at 600° C. in dry hydrogen. The resulting member was suitable for use as a thermoelectric pellet. Similarly, otherwise identical thermoelectric elements without a diffusion barrier layer were also prepared.

All of the above elements were then prepared for life testing by brazing the elements on the opposite or exposed side of the barrier layer to gold plated nickel straps. The method of computing the electrical properties of the thermoelectric element from the test data was similar to that employed by A. F. Ioffe in his book titled "Semiconductor Thermoelements and Thermoelectric Cooling," chapters 1 and 2. After the life test apparatus was sealed, the specimens were heated in argon to a hot side temperature of 600° C. and a cold side temperature of 150° C. With reference to FIG. 3, it can be appreciated that the thermoelectric elements with diffusion barrier layers exhibited a marked high level of desired electrical properties over the test period, to wit, $S^2/\rho$ where $\rho$=resistivity, and $S$=Seebeck coefficient, etc., in relation to the thermoelectric elements without a diffusion barrier layer. While the results indicated on the graph are for a test period of somewhat over 200 hours, practically the same results have been obtained with test periods of up to 1000 hours. After the tests, the thermoelectric pellets with diffusion barrier layers were examined microscopically and the joint between the thermoelectric body and the iron diffusion barrier layer appeared to be sound and continuous and relatively unchanged. Other thermoelectric materials with a diffusion barrier layer, heretofore mentioned, when produced and tested in accordance with the above example have provided essentially the same good electrical properties.

The same improvement in electrical properties may be obtained by using other diffusion barrier layers on different thermoelectric materials when applied in the same way. Choice of the preferred diffusion barrier layer depends on an analysis of the possible reactions between the diffusion barrier and a thermoelectric material. Liquid solid and solid reactions, match in expansion characteristics, electrical resistance of the interface, and compatability with the powder processing techniques for the thermoelectric material must be considered.

It is to be understood that the foregoing description and drawings should be interpreted as illustrative and not limiting.

We claim as our invention:

1. A thermoelectric element suitable for use in a thermoelectric device comprising a shaped body of thermoelectric material selected from the group consisting of lead telluride, germanium telluride and germanium bismuth telluride and a relatively thin, unfused, low electrical resistance diffusion barrier layer bonded to at least one end thereof, the layer being composed of at least one metal selected from the group consisting of cobalt, chromium, iron, molybdenum, silicon, zirconium and titanium.

2. A thermoelectric element suitable for use in a thermoelectric device comprising a shaped body of thermoelectric material selected from the group consisting of lead telluride, germanium telluride and germanium bismuth telluride and an unfused low electrical resistance diffusion barrier layer of from 1 to 25 mils in thickness bonded to at least one end thereof, the layer being composed of at least one metal selected from the group consisting of cobalt, chromium, iron, molybdenum, silicon, zirconium and titanium.

3. A thermoelectric element suitable for use in a thermoelectric device comprising a shaped body of thermoelectric material selected from the group consisting of lead telluride, germanium telluride and germanium bismuth telluride and a relatively thin, unfused low electrical resistance diffusion barrier layer bonded to both ends thereof, the layer composed of at least one metal selected from the group consisting of cobalt, chromium, iron, molybdenum, silicon, zirconium and titanium.

4. A thermoelectric element suitable for use in a thermoelectric device comprising a shaped body of thermoelectric material selected from the group consisting of lead telluride, germanium telluride and germanium bismuth telluride and an unfused low electrical resistance diffusion barrier layer of from 1 to 25 mils in thickness comprising essentially iron, bonded to at least one end of the thermoelectric element.

5. A thermoelectric element suitable for use in a thermoelectric device comprising a shaped body of thermoelectric material selected from the group consisting of lead telluride, germanium telluride and germanium bismuth telluride and an unfused low electrical resistance metallic diffusion barrier layer disposed between and bonded to the body and brazed to a metal contact.

6. A thermoelectric element suitable for use in a thermoelectric device comprising a body of thermoelectric material comprising a solid compound of at least one element selected from the group consisting of sulfur, selenium and tellurium reacted with at least one other metallic element and a relatively thin, unfused, low electrical resistance diffusion barrier layer bonded to at least one end thereof, the layer composed of at least one metal selected from the group consisting of cobalt, chromium, iron, molybdenum, silicon, zirconium and titanium.

7. A thermoelectric element suitable for use in a thermoelectric device comprising a body of thermoelectric material comprising a solid compound of at least one element selected from the group consisting of sulfur, selenium, and tellurim reacted with at least one other metallic element and an unfused low electrical resistance diffusion barrier layer of from 1 to 25 mils in thickness bonded to at least one end thereof, the layer composed of at least one metal selected from the group consisting of cobalt, chromium, iron, molybdenum, silicon, zirconium and titanium.

8. A thermoelectric element suitable for use in a thermoelectric device comprising a solid compound of at least one element selected from the group consisting of sulfur, selenium and tellurium reacted with at least one other metallic element and a relatively thin, unfused, low electrical resistance diffusion barrier layer bonded to both ends thereof, the layer composed of at least one metal selected from the group consisting of cobalt, chromium, iron, molybdenum, silicon, zirconium and titanium.

9. A thermoelectric element suitable for use in a thermoelectric device comprising a solid compound of at least one element selected from the group consisting of sulfur, selenium and tellurium reacted with at least one other metallic element and an unfused low electrical resistance diffusion barrier layer of from 1 to 25 mils in thickness comprising essentially iron, bonded to at least one end of the thermoelectric element.

10. A thermoelectric element suitable for use in a thermoelectric device comprising a body of thermoelectric material comprising a solid compound of at least one element selected from the group consisting of sulfur, selenium and tellurium reacted with at least one other metallic element and an unfused low electrical resistance metallic diffusion barrier layer disposed between and bonded to the body and brazed to a metal contact.

11. A thermoelectric element suitable for use in a thermoelectric device comprising a shaped body of thermoelectric material and a relatively thin, unfused, low electrical resistance, metallic diffusion barrier layer joined to at least one end thereof, the element being capable of operating at temperatures of up to the melting point of the thermoelectric material.

12. In the process of forming a thermoelectric element, the steps comprising simultaneously compressing in a cylinder a quantity of powder of thermoelectric material comprising a solid compound of at least one element selected from the group consisting of sulfur, selenium and tellurium reacted with at least one other metallic element and a quantity of powder consisting of at least one metal selected from the group consisting of cobalt, chromium, iron, molybdenum, silicon, zirconium and titanium, the metal powder being disposed on at least one end of said mass of thermoelectric material without fusing thereto so as to function as a barrier layer, and sintering the resultant shaped body to provide a composite structure of thermoelectric material with a protective diffusion barrier layer.

13. A thermoelectric element suitable for use in a thermoelectric device comprising a shaped body of thermoelectric material and a relatively thin, unfused, low electrical resistance, metallic diffusion barrier layer joined on both ends thereof and a relatively good electrically and thermally conductive metal contact soldered to the diffusion barrier layers, the element being capable of operating at temperatures approaching the melting point of the thermoelectric material.

14. A thermoelectric element suitable for use in a thermoelectric device comprising a shaped body of thermoelectric material selected from the group consisting of lead telluride, germanium telluride and germanium bismuth telluride, a relatively thin, unfused, low electrical resistance diffusion barrier layer joined to both ends thereof, the layer being composed of at least one metal selected from the group consisting of cobalt, chromium, iron, molybdenum, silicon, zirconium and titanium and a relatively good electrically and thermally conductive metal contact joined to the diffusion barrier layers, the contact being selected from the group consisting of copper and copper base alloys, aluminum and aluminum base alloys, and silver and silver base alloys.

15. A thermoelectric element suitable for use in a thermoelectric device comprising a body of thermoelectric material comprising a solid compound of at least one element selected from the group consisting of sulfur, selenium, and tellurium reacted with at least one other metallic element, a relatively thin, unfused, low electrical resistance diffusion barrier layer bonded to both ends thereof, the layer composed of at least one metal selected from the group consisting of cobalt, chromium, iron molybdenum, silicon, zirconium and titanium and a relatively good thermally and electrically conductive metal contact soldered to the diffusion barrier layers, the contact comprising a material selected from the group consisting of copper and copper base alloys, aluminum and aluminum base alloys and silver and silver base alloys.

References Cited in the file of this patent

UNITED STATES PATENTS

| 2,406,172 | Smithelle | Aug. 20, 1946 |
| 2,597,752 | Salisbury | May 20, 1952 |
| 2,811,569 | Fredrick et al. | Oct. 29, 1957 |
| 2,942,051 | Roeder | June 21, 1960 |
| 2,949,497 | Jarris et al. | Aug. 16, 1960 |
| 2,952,725 | Evans et al. | Sept. 13, 1960 |
| 2,952,980 | Douglas | Sept. 20, 1960 |

OTHER REFERENCES

Horne: "RCA Technical Note No. 305," November 1959 (1 page).

Horne et al.: "RCA Technical Note No. 304," November 1959 (1 page).